United States Patent
Tarnowski et al.

(10) Patent No.: US 11,717,086 B2
(45) Date of Patent: Aug. 8, 2023

(54) ROTARY RECLINE MECHANISM

(71) Applicant: B/E Aerospace, Inc., Winston-Salem, NC (US)

(72) Inventors: Adrian Tarnowski, Wroclaw (PL); Tomasz Wanski, Chrzastawa Wielka (PL); Lukasz Turek, Wroclaw (PL); Tomasz Kupczyk, Lomianki Dolne (PL)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/517,321

(22) Filed: Nov. 2, 2021

(65) Prior Publication Data

US 2022/0133043 A1 May 5, 2022

(30) Foreign Application Priority Data

Nov. 5, 2020 (EP) .................................... 20461579

(51) Int. Cl.
*A47C 1/027* (2006.01)
*B64D 11/06* (2006.01)

(52) U.S. Cl.
CPC ............ *A47C 1/027* (2013.01); *B64D 11/064* (2014.12)

(58) Field of Classification Search
CPC ............................... A47C 1/027; B64D 11/064
See application file for complete search history.

(56) References Cited

U.S. PATENT DOCUMENTS

| | | | |
|---|---|---|---|
| 3,216,766 A | 11/1965 | Tabor | |
| 3,474,487 A | 10/1969 | Resag et al. | |
| 3,515,433 A | 6/1970 | Tabor | |
| 4,062,587 A | 12/1977 | Wolters | |
| 5,031,270 A | 7/1991 | Lee | |
| 5,486,056 A * | 1/1996 | Thorn | A47C 1/027 403/120 |
| 9,211,013 B2 | 12/2015 | Harrison et al. | |
| 2014/0217764 A1 | 8/2014 | Bradley et al. | |
| 2017/0367483 A1 | 12/2017 | Fecker et al. | |

FOREIGN PATENT DOCUMENTS

| | | |
|---|---|---|
| DE | 4014154 A1 | 11/1991 |
| DE | 10129268 A1 | 12/2002 |
| DE | 202007009839 U1 | 11/2008 |
| GB | 2193884 B | 12/1989 |

OTHER PUBLICATIONS

EPO Search Report dated Apr. 20, 2021 for European Application No. 20461579.3, 8 pages.

* cited by examiner

*Primary Examiner* — Anthony D Barfield
(74) *Attorney, Agent, or Firm* — Suiter Swantz pc llo

(57) ABSTRACT

A rotary recline mechanism for allowing reclining movement of a first part relative to a second part, the mechanism comprising: a plurality of friction pads arranged to be compressed together, the plurality of friction pads comprising alternating first friction pads connected to the first part and second friction pads connected to the second part; biasing means to bias the friction pads into compressed frictional engagement; actuator means to which force is applied by a user; and a force transmission means that translates a first force applied by the user in a first direction to act against the force of the biasing means to release the frictional pads from the compressed frictional engagement to allow the first friction pads to rotate relative to the second friction pads.

13 Claims, 12 Drawing Sheets

ROTARY RECLINE MECHANISM

TECHNICAL FIELD

The present disclosure is concerned with surface angle adjustment mechanisms that enable a first part or surface to recline with respect to a second part or surface, for example a mechanism for reclining a seat back with respect to a seat pan or seat cushion.

BACKGROUND

There are many applications where it is desired to enable a rotary movement of one part or surface relative to another such that the angular relationship between the two parts or surfaces can be varied. One example is an adjustable seat or chair, where it may be desirable to adjust the angle of the seat back relative to the seat pan to allow the seat back to be moved between an upright position and a reclined position. Adjustable seats are used in the home and workplace as well as in vehicles such as automobiles and aircraft. In aircraft seats, the seat generally has to be in an upright position for take-off and landing but can be reclined during flight to improve passenger comfort. The seat can be reclined by the passenger operating a button or lever, usually in or on the seat arm and pushing back against the seat back until the seat is in the desired reclined position. The seat will remain in the reclined position until the passenger operates the button or lever to cause the seat to return to the upright position. Various mechanisms are known for allowing seat backs to be reclined in aircraft seats and also in other types of adjustable seats. Such mechanisms are also known for allowing adjustment of surfaces other than seats.

Mechanisms are known that comprise mechanical actuators for adjusting the position and angle of the seat back and seat pan relative to a fixed frame. Some mechanisms use lock members having teeth and pawl arrangements. A mechanical actuator, operated by the user, disengages the teeth so that the seat back can be pushed back from the upright position with respect to the seat pan. A spring is biased to bring the seat back back to the upright position. A disadvantage of such mechanisms is that the number or range of recline positions may be limited.

Other recline mechanisms, which are better able to provide a greater range of positions, include a gas spring mechanism. The user operates an actuator e.g. by pressing a button that releases a valve in the gas spring to allow the seat back to be pushed back to a desired reclined position by the user exerting force on the seat back. To bring the seat back back to the upright position, the button is pressed, the gas that has accumulated in the spring is released and the seat back moves to the upright position.

Such conventional mechanisms are fairly complex in construction and are large, heavy and costly to manufacture, install and maintain. There is a need for a recline mechanism that has a simpler construction and that is lighter and takes up less space but still allows a simple, robust operation and allows a large range of recline positions. Particularly (but not only) in aircraft, size and weight considerations are important.

SUMMARY

According to one aspect of the disclosure, there is provided a rotary recline mechanism for allowing reclining movement of a first part relative to a second part, the mechanism comprising: a plurality of friction pads arranged to be compressed together into compressed frictional engagement, the plurality of friction pads comprising alternating first friction pads connected to the first part and second friction pads connected to the second part; biasing means to bias the friction pads into compressed frictional engagement; actuator means to which a force is applied by a user; and a force transmission means that translates a force applied by the user in a first direction to act against the force of the biasing means to release the frictional pads from the compressed frictional engagement to allow the first friction pads to rotate relative to the second friction pads.

The mechanism optionally also includes a second biasing means that biases the first part to an upright position with respect to the second part when the actuator means is not actuated by the user. The second biasing means may be a torsional spring that is assembled in a pre-loaded state. Application of a second force to the actuator means by the user, opposite to the first force, causes the second biasing means to return the first part to the upright position from a reclined position.

In one example, the first pads have a shape different from that of the second pads.

The first pads may be attached to a shaft that is connected to the first part, e.g. via a first flange, while the second pads are attached to e.g. the casing which is attached to the second part via e.g. a second flange. Hard stops may be provided on the shaft and the casing to limit the rotational movement of the pads.

The biasing means biases the pads into compression with each other and is preferably a compression spring that, in the normal state, positions the force transmission means such that when the actuator means is not operated, force is applied to compress the friction pads and when the actuator means is operated, compressive force is removed to disengage the friction pads.

The force transmission means may comprise a first component that is moved in response to actuation of the actuator means by the user and a second component that is moved by engagement with the first component to release the pads from compressed frictional engagement. In the normal state, when the actuator means is not actuated by the user, the first component engages with the second component such that the second component presses against the friction pads. The first component may comprise an element that is engaged with the actuator means and is shaped to engage with a first end of the second component, where the second component is a lever arranged to pivot around a pivot point in response to engagement with the first component, the second end of the second component moving relative to the friction pads as the second component pivots.

The mechanism may also be provided with head injury criterion (HIC) features which may include a lock ring and a key ring that in a normal state are arranged axially one behind the other and in a lock state rotate relative to each other to engage in the same axial position, one radially outward from the other. The HIC features are mounted axially with respect to the friction pads such that the compressive force on the pads is reduced when the HIC lock ring and key ring are in the lock state. This allows the pads to rotate with respect to each other and, due to the recline mechanism being biased in the upright position, the first part can automatically return to the upright position, without the need for the user to operate the actuator means.

The first part may be a seat back and the second part may be a seat pan or a seat cushion of a reclining or adjustable seat such as an aircraft seat.

Examples of the disclosure will be described, by way of example only, with reference to the drawings.

DETAILED DESCRIPTION

Figure 1A:
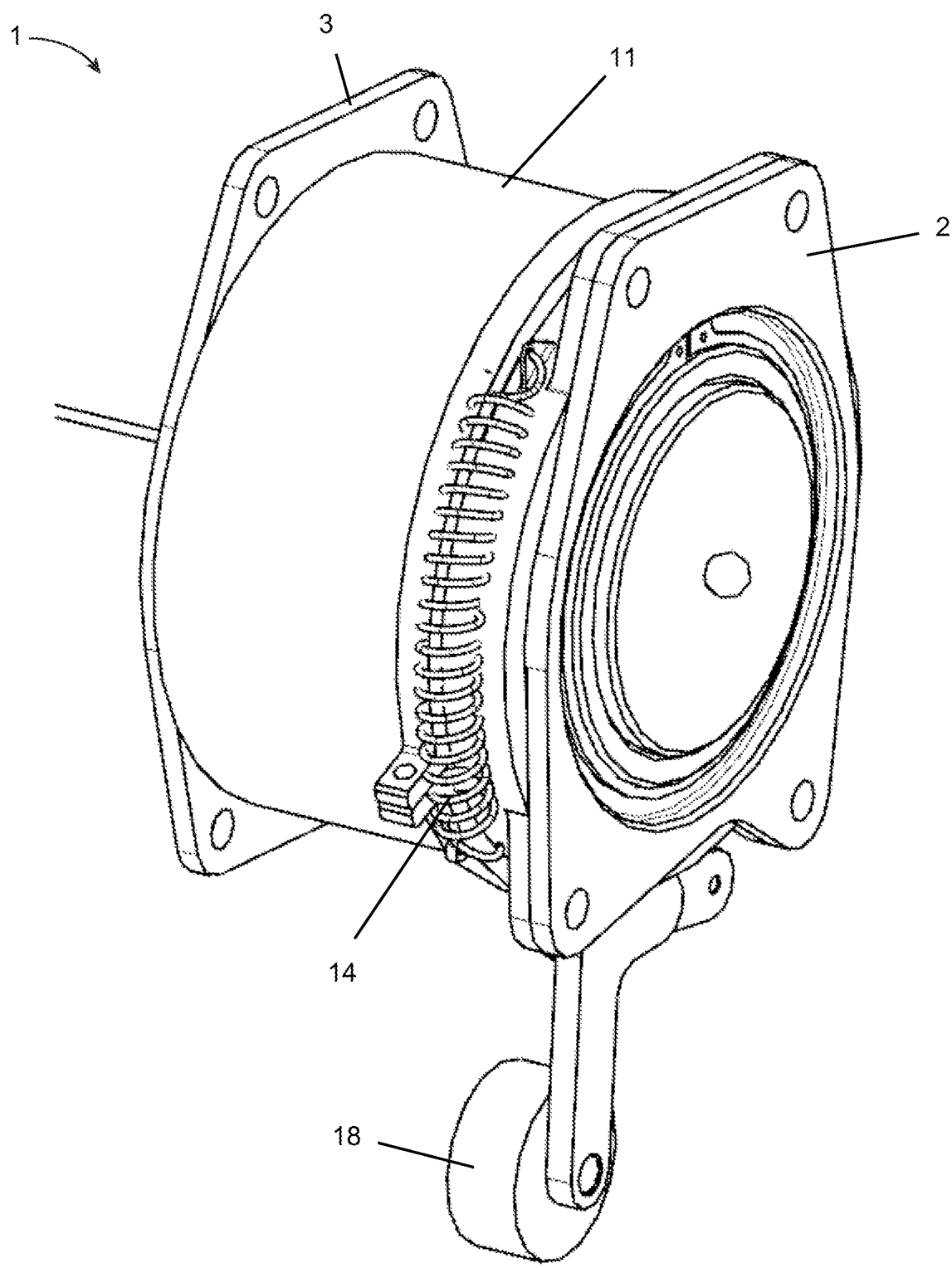
FIG. 1A is a perspective view of a rotary recline mechanism according to the disclosure.
Figure 1B:
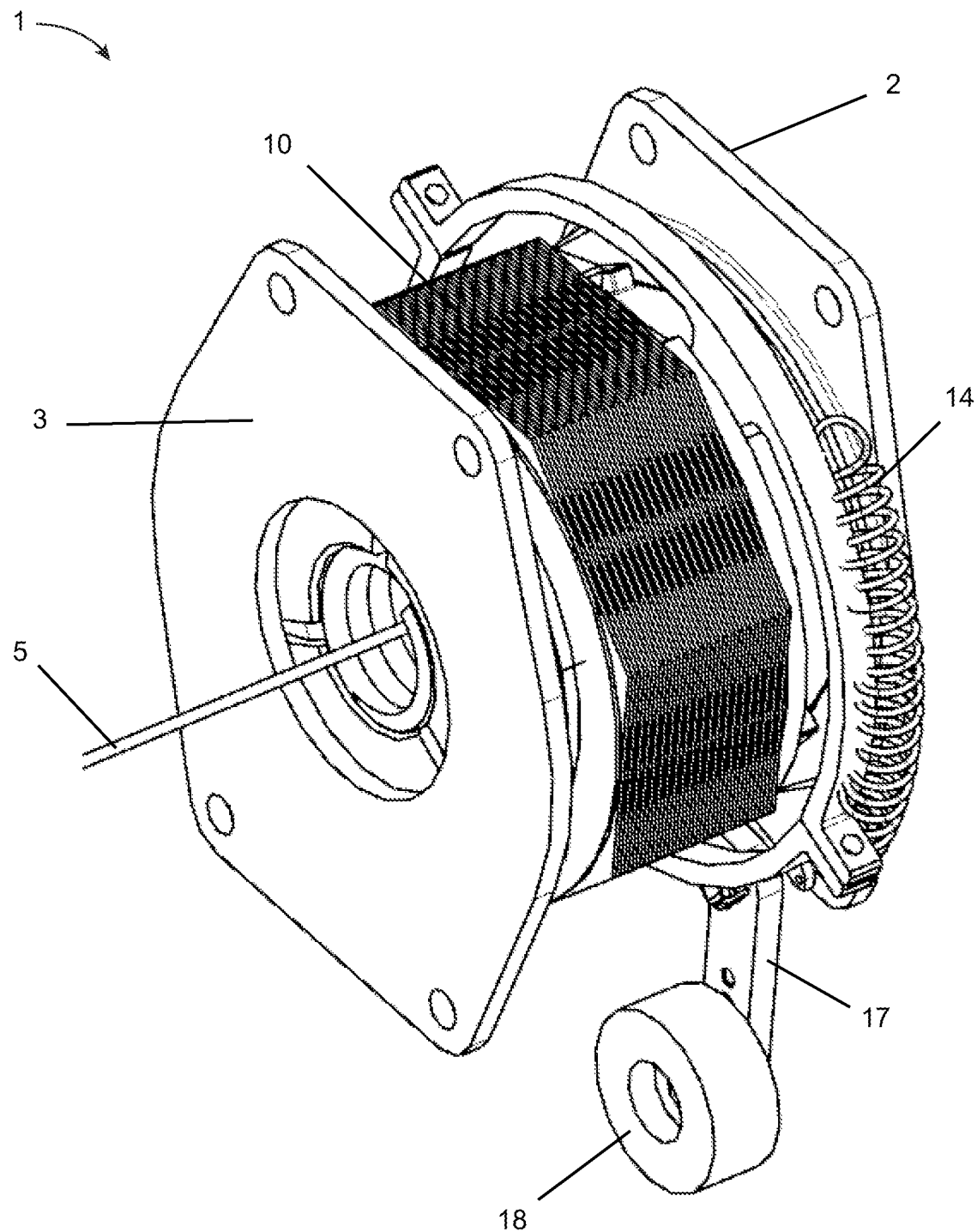
FIG. 1B is a perspective view of the mechanism of FIG. 1A viewed from the opposite side and with the casing removed.

Referring to the figures, the mechanism 1 is provided in a unit to be mounted to the parts or surfaces to be adjusted relative to each other. The following description refers to the mechanism for use in adjusting a seat 20 e.g. an aircraft passenger seat 20. It should be noted, however, that the disclosure is not so limited and the mechanism can be used in other reclining or adjustable seats or, indeed, in other applications where two parts or surfaces are to be adjusted relative to each other.

For ease of installation, the mechanism 1 may be provided with fastening means such as flanges for attachment to the two parts between which relative movement is to be provided. In the example shown, the mechanism 1 is provided with a first flange 2 for attachment to the seat back 21 and, on the opposite side of the mechanism 1, a second flange 3 for attachment to the seat pan 22 or seat cushion 23. Between the flanges, as will be described in more detail below, are mounted a torsion spring 4, a mechanism actuator 5, a slider 6, a compression spring 7, a force multiplier lever 8, and an inner shaft 9 around which are mounted a plurality of friction pads 10, comprising a first plurality of first friction pads 10a alternating with a second plurality of second friction pads 10b. The first friction pads 10a are attached to the seat back 21, via the shaft 9, and the second friction pads are attached to the seat cushion 23 (or vice versa). In a preferred arrangement, the first friction pads have a shape different from the second friction pads. A case 11 may be provided around the friction pads 10.

Operation of the mechanism will now be described in detail with reference to the drawings.

Figure 2:
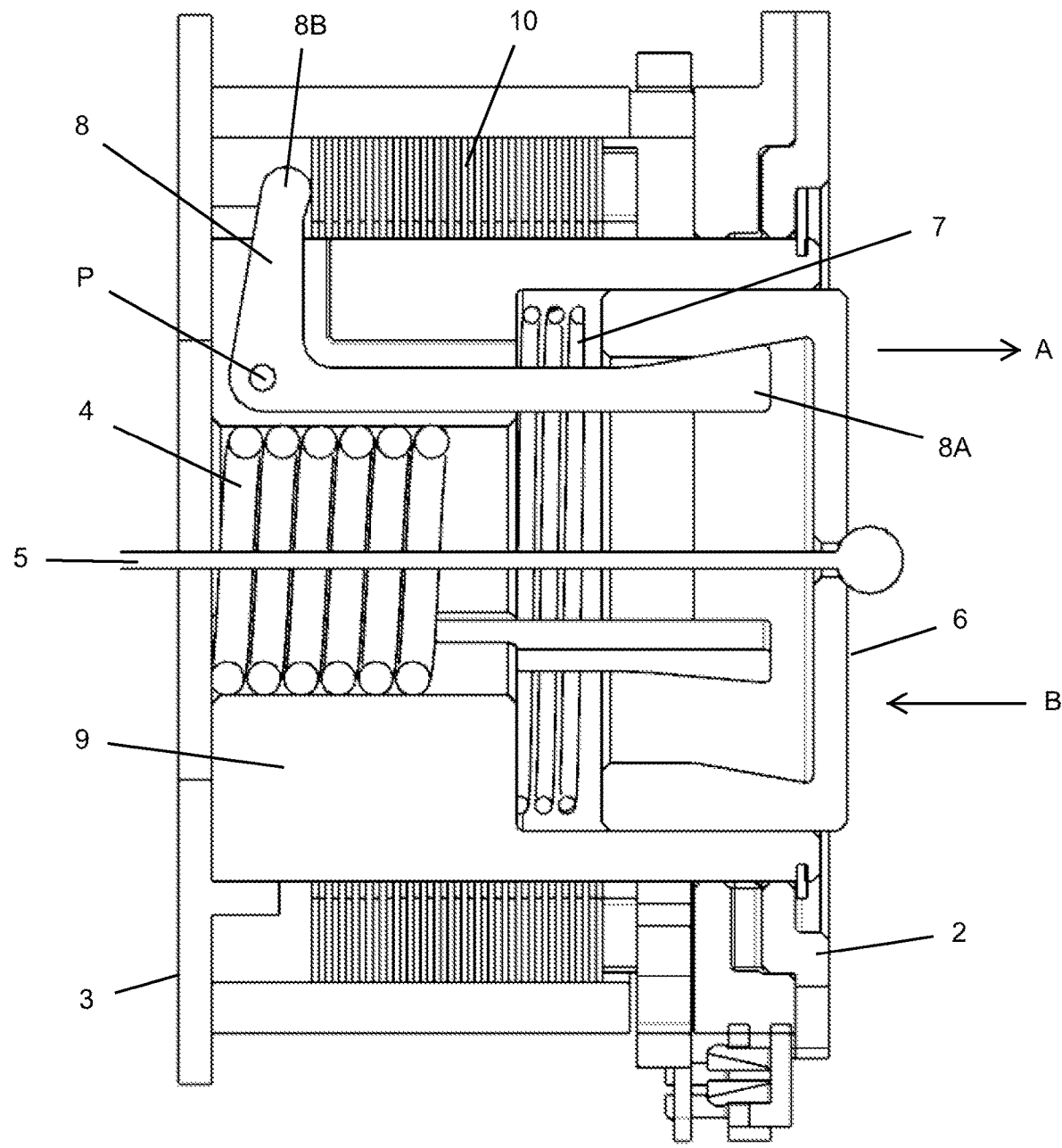
FIG. 2 is a schematic view of a mechanism according to the disclosure.

When the friction pads 10 are compressed together, the seat back is held in a position relative to the seat pad. This is the normal state of the mechanism. The torsion spring 4 is biased to secure the seat back in an upright position and the torsion spring 4 is assembled in a pre-loaded state so that the default position of the seat back is the upright position. The compression spring 7 is biased to cause the slider to be pushed to the right in FIG. 2 (in the direction of arrow A) such that it engages the force multiplier lever 8 causing it to pivot about pivot point P and thus to press against the friction pads 10 so that they are highly compressed together, thus locking the seat back in position.

When the seat back is to be reclined, the user pulls on the mechanism actuator 5 in direction A which, in turn, compresses compression spring 7 causing the slider 6 to move to the left i.e. in direction B. This releases the engagement between the slider and the lever 8 allowing lever 8 to pivot anti-clockwise about pivot point P. The lever then moves out of compressing relationship with the friction pads 10 thus allowing the seat back to move relative to the seat pan. In this configuration, if the user presses against the seat back in the reclining direction, the seat back can recline relative to the seat pad. When the seat back is in the desired position, the user releases the actuator 5 which, in turn, causes the compression spring 7 to return to its expanded state which pushes slider 6 in direction A causing the slider to engage with and pivot the lever 8 to compress the friction pads 10 and to lock the seat back position.

To return the seat back to the upright position or a more upright position, the user presses the actuator 5 and the spring force of the torsion spring 4 causes the seat back to move from the reclined position towards the upright position. Hard stops 20, 21 may be provided to prevent over-rotation of the mechanism.

The combination of the actuator 5, the slider 6 and the lever 8 acts to multiply the force applied by the user. While specific configurations are shown in the examples and described above, other force multiplying components could be used to achieve the same effect, provided there is an actuator to which the user applies a force, and a means for amplifying and translating that force to a compressive force acting on the friction pads.

In some applications, e.g. in aircraft, there is a desire or need for the seat back to return to an upright position from a recline position automatically in the case of an emergency. This may be necessary, for example, to prevent a passenger in a seat behind a reclined seat, hitting their head on the reclined seat in the cases of a sudden stop or impact. In one example of the mechanism of this disclosure, a so-called HIC (Head Injury Criterion) feature is incorporated into the recline mechanism to automatically return the seat back to the upright position in certain circumstances.

Figure 3:
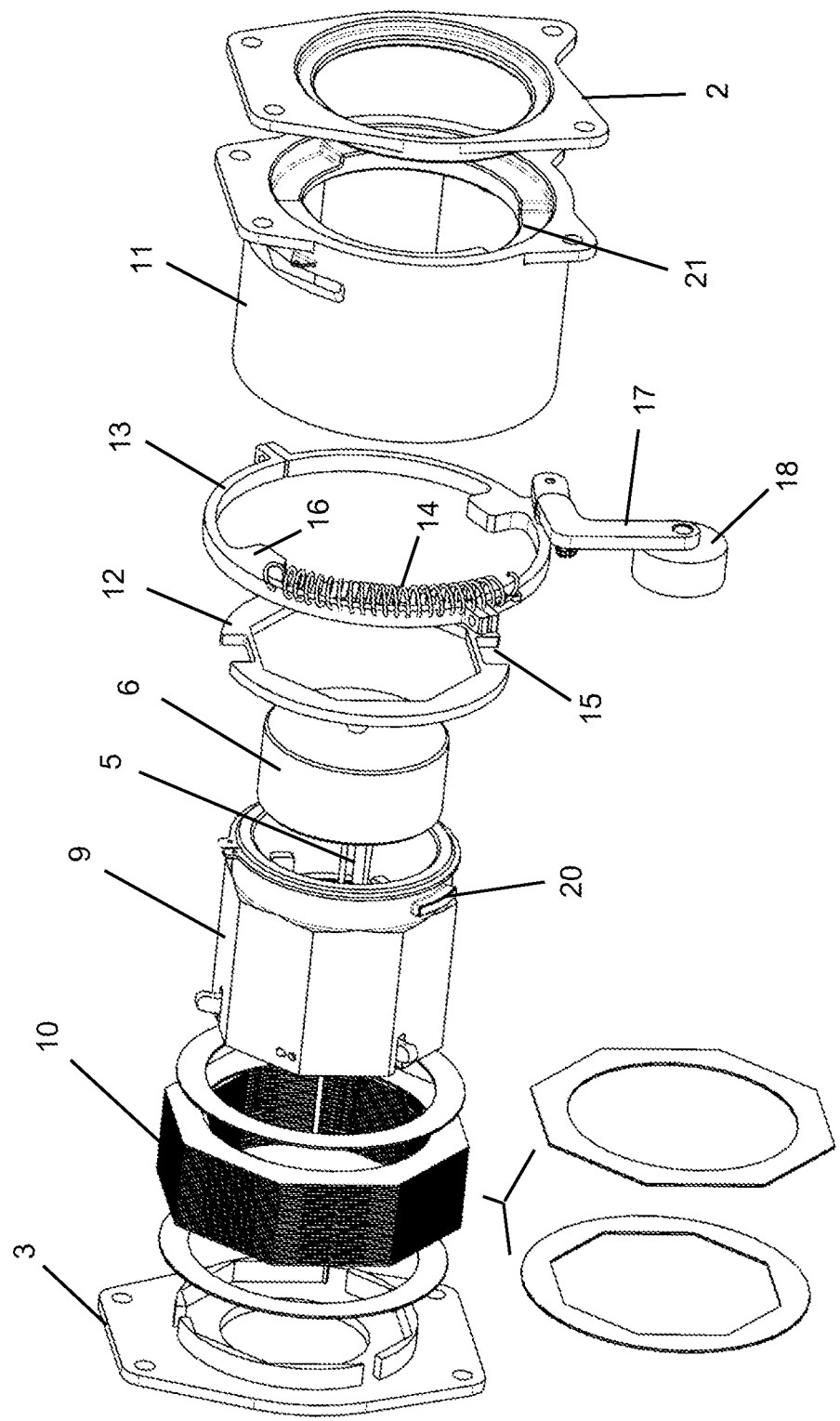
FIG. 3 is an exploded view of a mechanism according to the disclosure.
Figure 4:
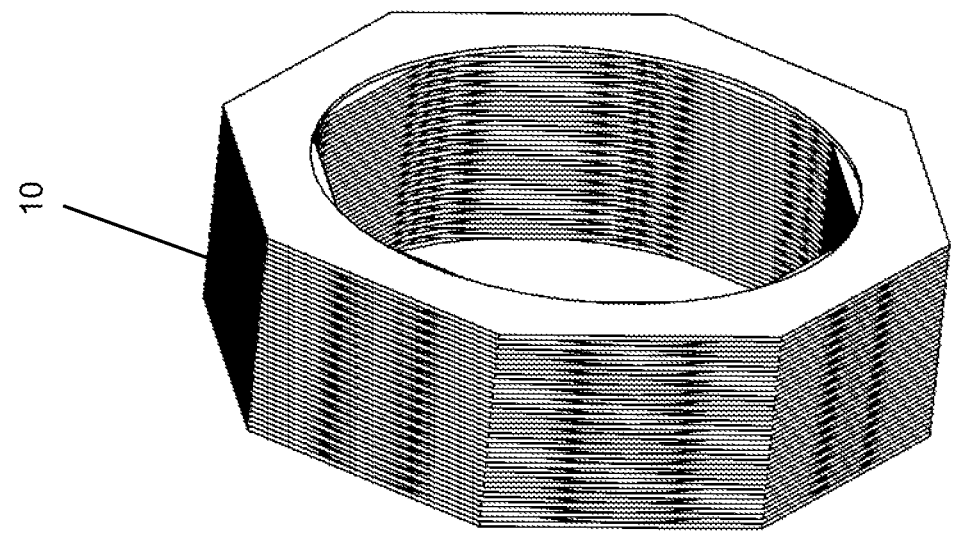
FIG. 4 is a detailed view of friction plates of a mechanism according to the disclosure.
Figure 4:
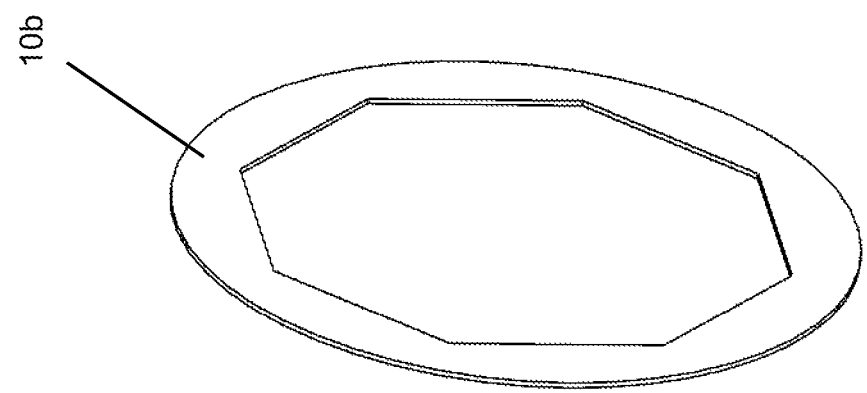
Figure 4:
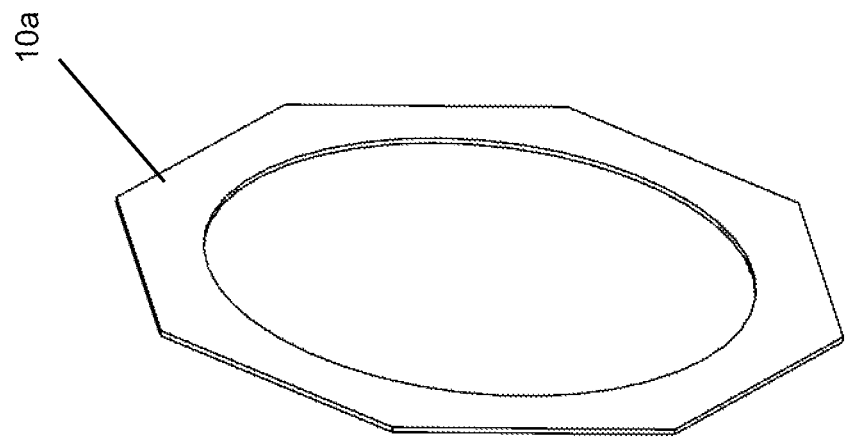
Figure 5:
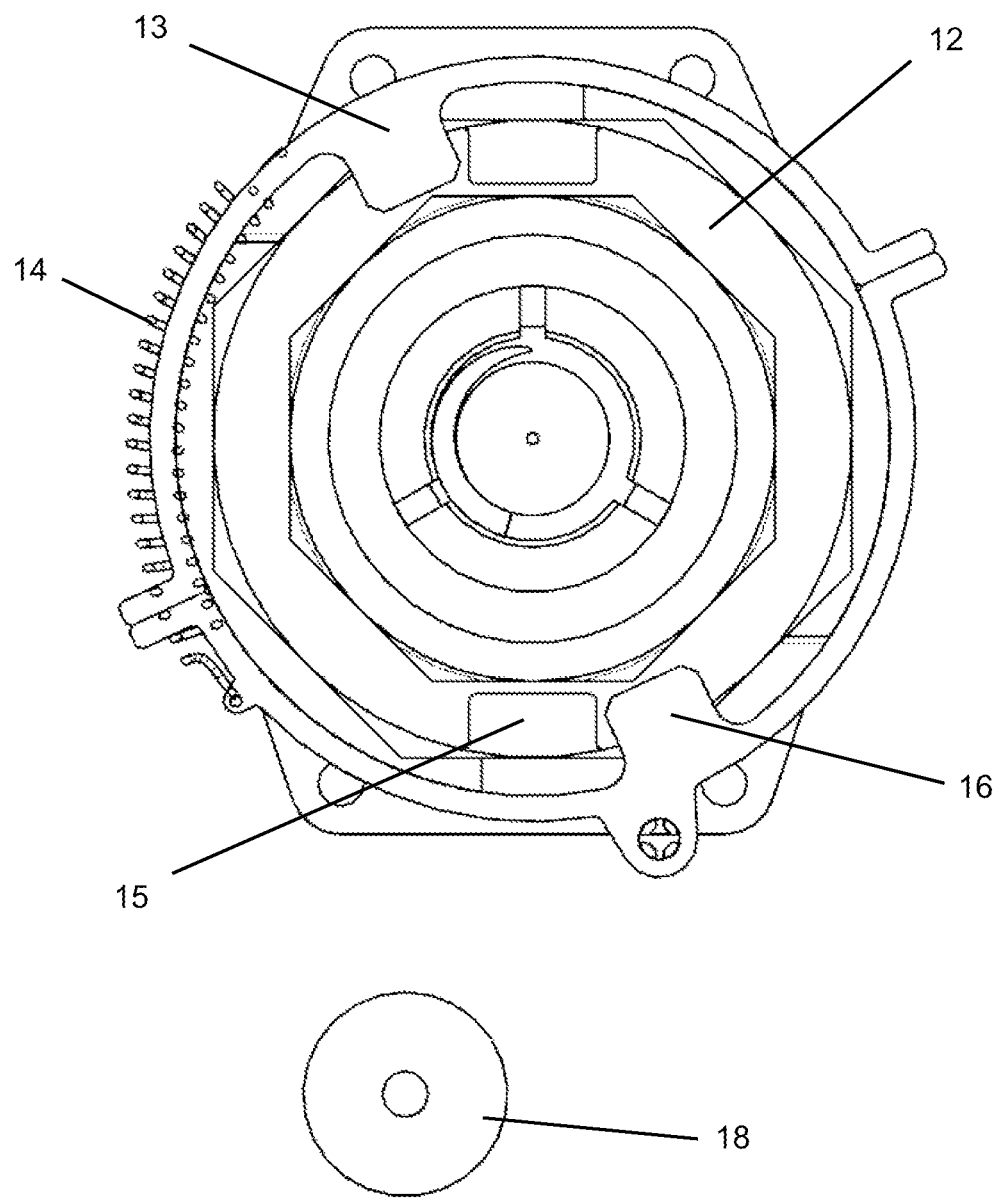
FIG. 5 is a sectional view of a mechanism according to the disclosure.
Figure 6A:
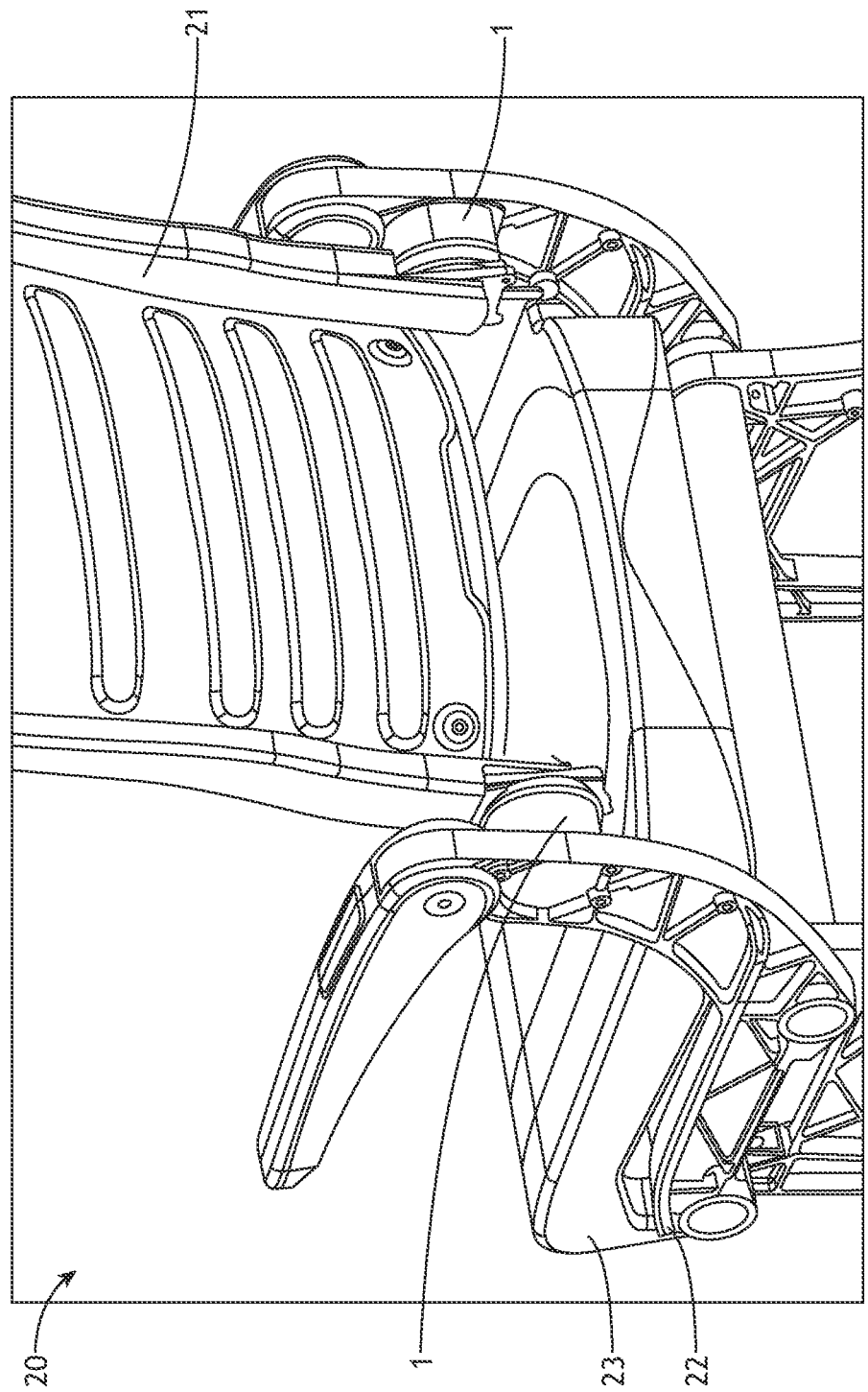
FIG. 6A is a perspective view of an aircraft seat including the rotary recline mechanism according to the disclosure.
Figure 6B:
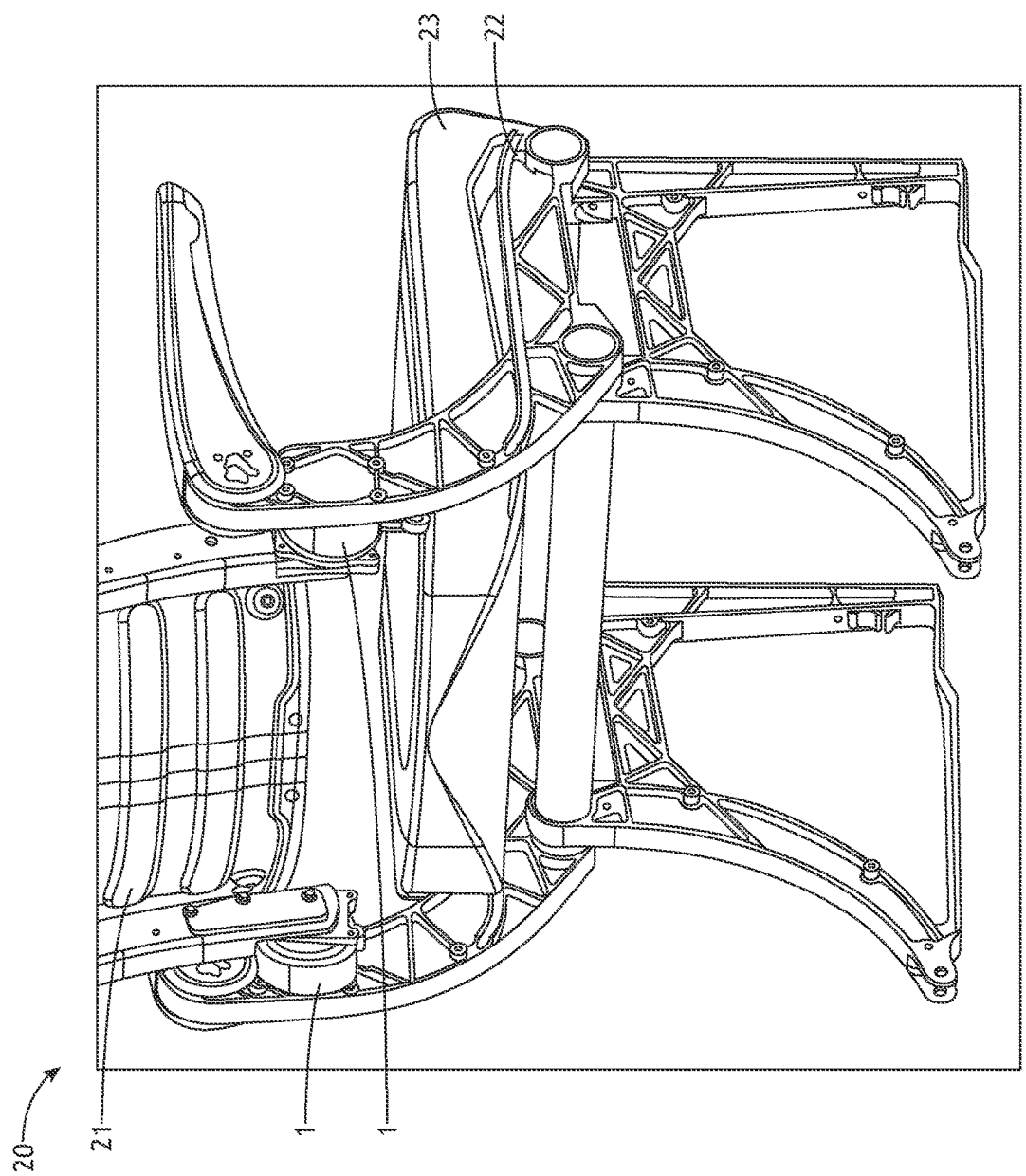
FIG. 6B is a perspective view of an aircraft seat including the rotary recline mechanism according to the disclosure.
Figure 7B:
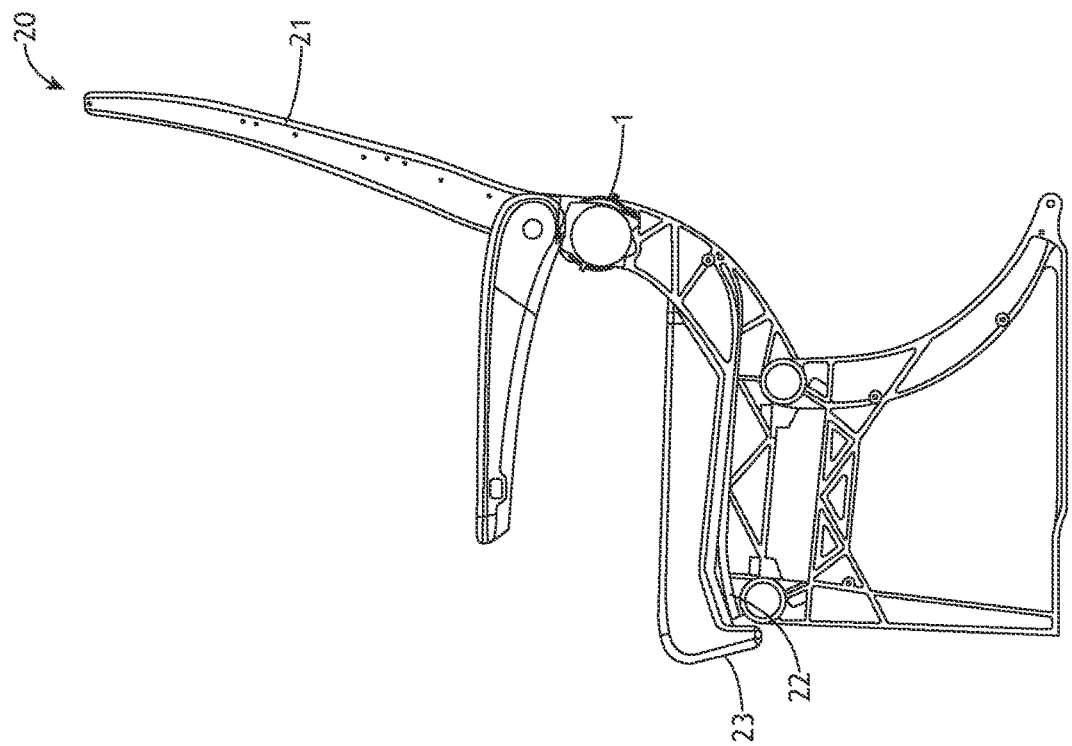
FIG. 7B is a side view of an aircraft seat including the rotary recline mechanism according to the disclosure.
Figure 7A:
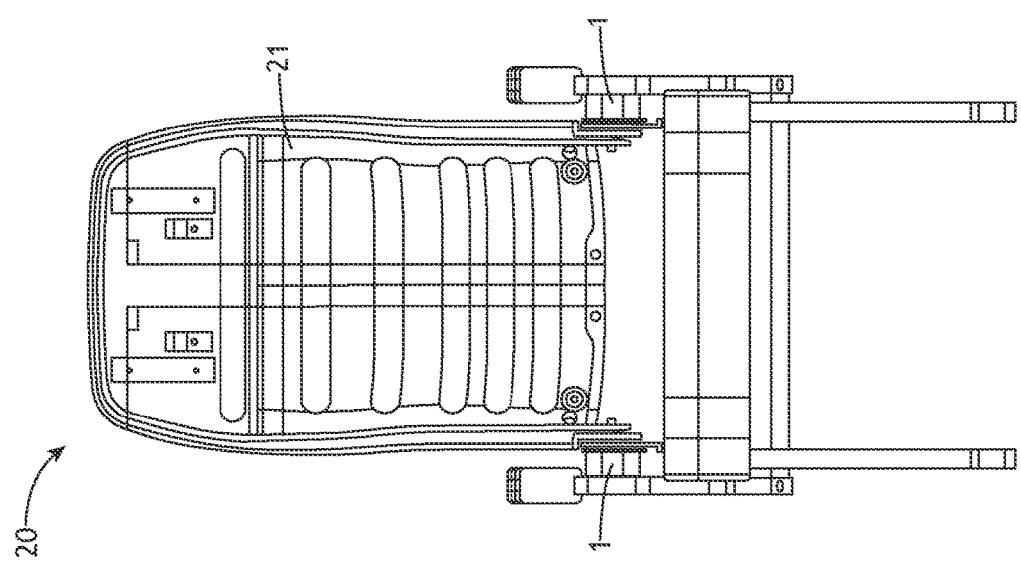
FIG. 7A is a rear view of an aircraft seat including the rotary recline mechanism according to the disclosure.
Figure 7C:
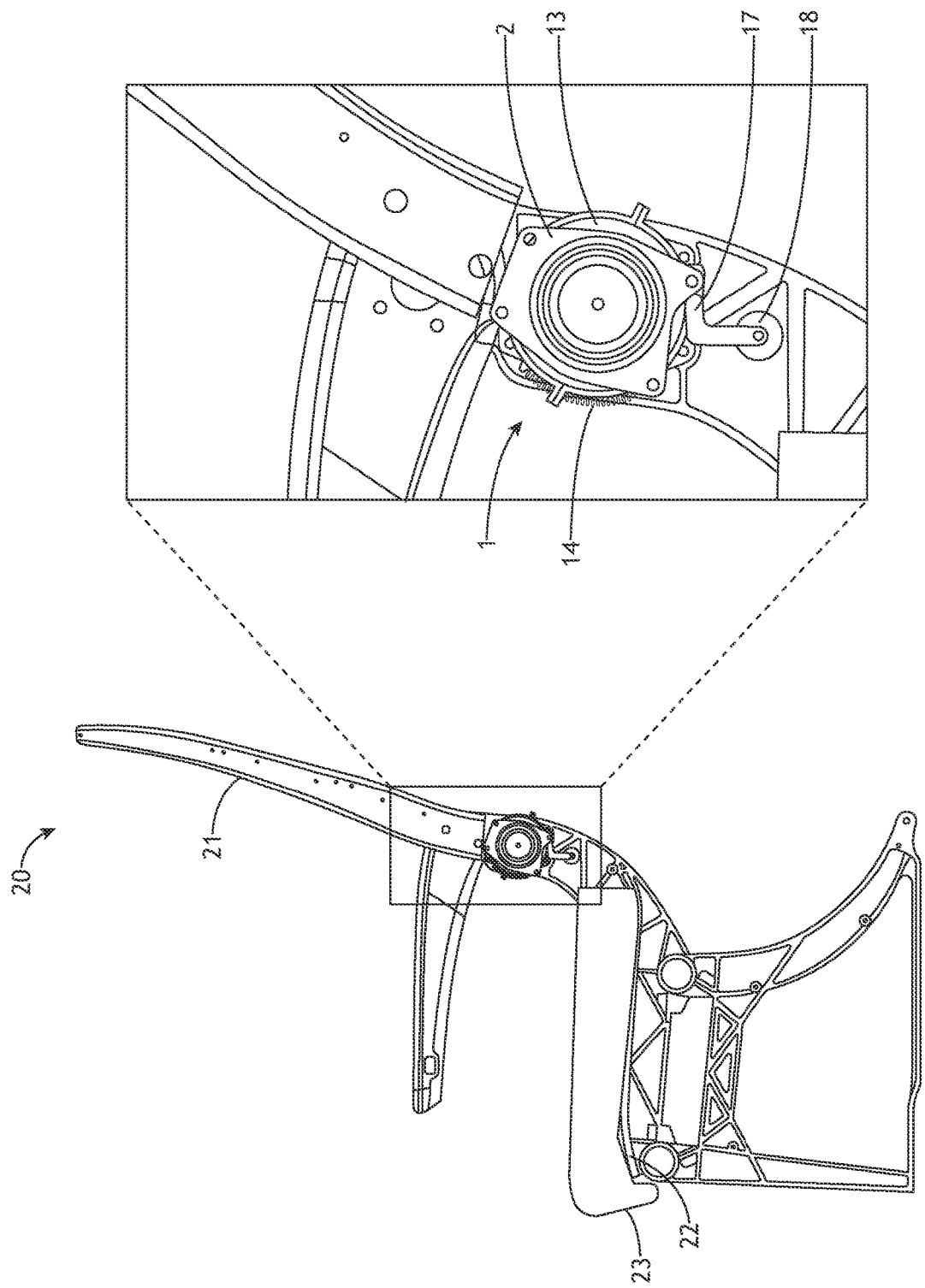
FIG. 7C is a detailed view of an aircraft seat including the rotary recline mechanism according to the disclosure.
Figure 8A:
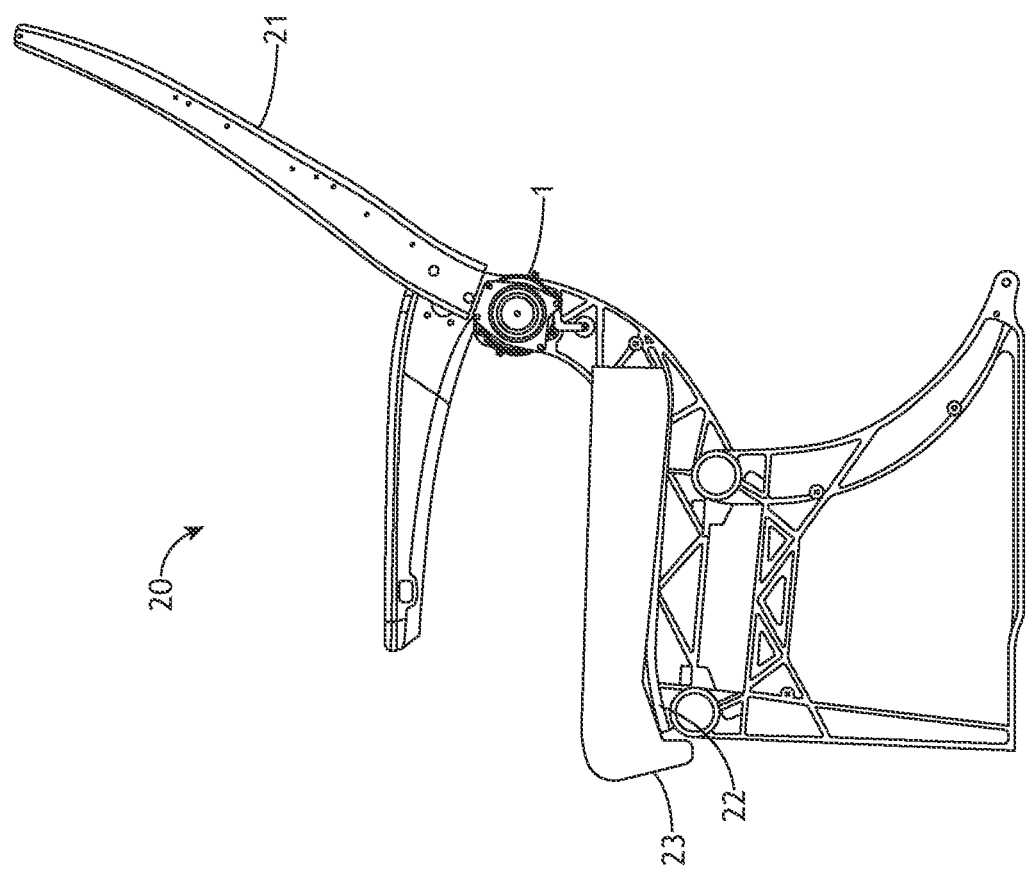
FIG. 8A is a side view of an aircraft seat including the rotary recline mechanism according to the disclosure.
Figure 8B:
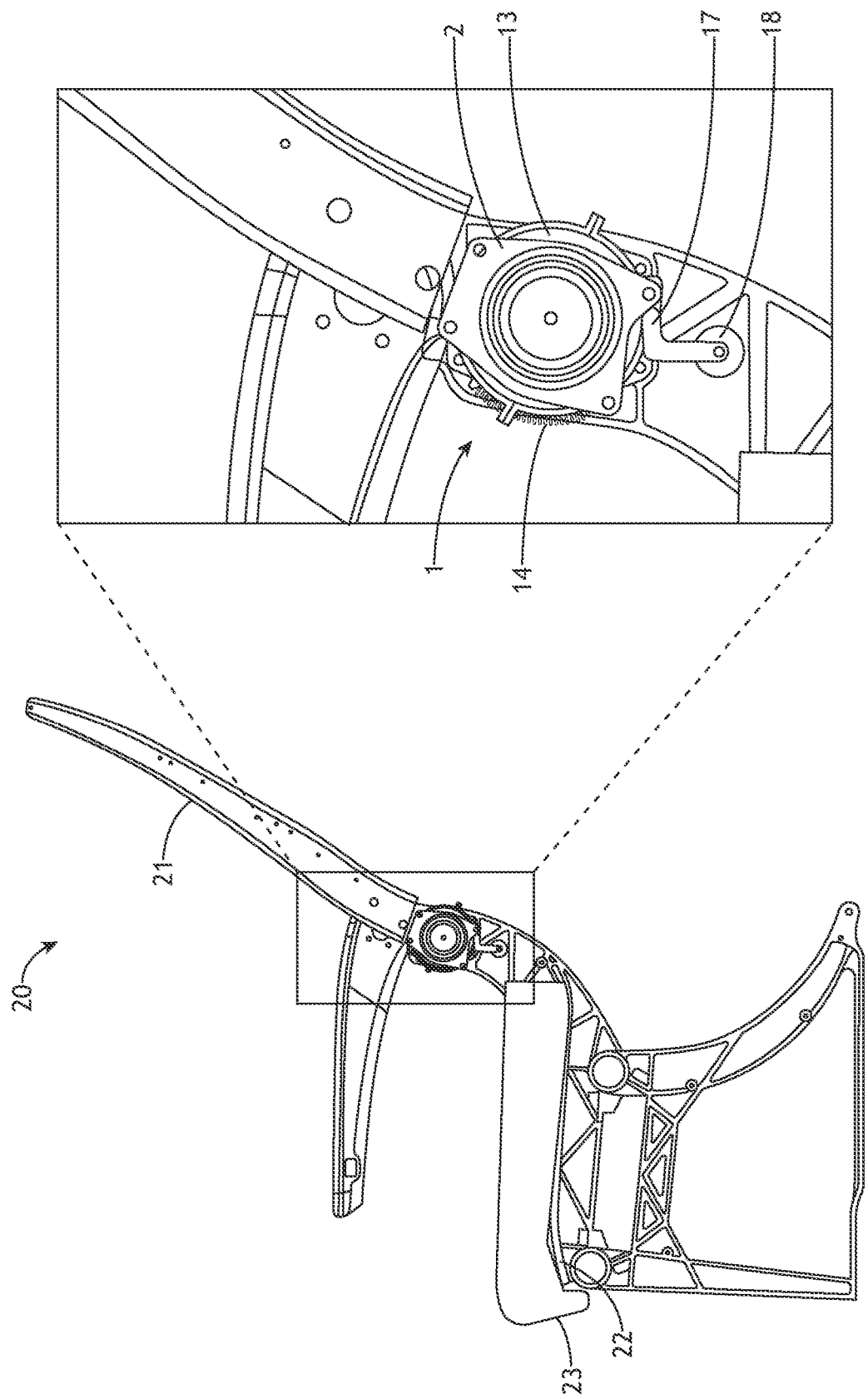
FIG. 8B is a detailed view of an aircraft seat including the rotary recline mechanism according to the disclosure.

The HIC feature will be described in more detail with particular reference to FIGS. 3 and 5.

The HIC feature is provided by a HIC event lock 12 and a HIC event key 13. The HIC event key 13 is comprised of a ring structure whereby part of the ring is replaced by a key spring 14 which is normally tensioned. The HIC event lock 12 is provided with recesses 15 around its outer surface. The HIC event key 13 is provided with correspondingly shaped protrusions 16 directed radially inwardly from the ring.

In normal circumstances, the HIC event lock 12 and the HIC event key 13 are arranged successively along the shaft 9 direction between the friction pads 10 and the flange 2. The combined thickness of the HIC event lock and the HIC event key is such that in the normal state, with the lever acting on one end of the friction pads and the HIC event plate and key and the flange hard stop acting on the other end, the friction pads 10 are in compression engagement so that they cannot rotate relative to each other.

The HIC event lock is also provided with a toggle mechanism 17 that is responsive to an emergency event such as a sudden impact. In the example shown, the toggle mechanism comprises a mass 18 that freely hangs from the HIC event key ring. On impact, the mass is caused to swing due to inertial forces acting on it which causes the key spring 14 to open and the HIC event key rotates relative to the HIC event lock and the protrusions 16 slot into the recesses 15 on the HIC event lock 12. The HIC event components are then no longer arranged axially relative to each other but, instead, for a single plate thickness which thus provides space for the friction pads to separate. The pads can then rotate relative to each other meaning that the seat back and rotate relative to the seat pan. Due to the bias of the torsion spring 4, the seat back will automatically move from the reclined position towards the upright position. To meet complete HIC requirements, the mechanism can be provided with a shear pin (not shown). During normal operation, hard stops limit the relative angular rotations between the shaft and the flanges. During an HIC event, the shear pin will be sheared to allow for further rotation and movement of the seat back in the forward direction.

The recline mechanism of this disclosure allows a continuous range of recline positions within the constraints of the hard stops using a relatively simple construction that is relatively simple and, therefore, relatively inexpensive, to manufacture, install and maintain. The mechanism is small and light compared to other, conventional mechanisms which is advantageous in many applications such as in aircraft. The use of friction pads means that the mechanism is 'dry' i.e. does not require any grease or oil lubrication and is very quiet in operation, thus adding to user comfort. The mechanism is simple to operate and can also, if required, be easily provided with a HIC mechanism to automatically return the reclining part to an upright position if needed e.g. in the case of emergency.

The invention claimed is:

1. A rotary recline mechanism for allowing reclining movement of a first part relative to a second part, the mechanism comprising:
   a plurality of friction pads arranged to be compressed together into a compressed frictional engagement, the plurality of friction pads comprising alternating first friction pads connected to the first part and second friction pads connected to the second part, wherein the first friction pads are attached to a shaft that is connected to the first part and the second friction pads are attached to a casing which is attached to the second part;
   a biasing means to bias the friction pads into the compressed frictional engagement;
   an actuator means to which force is applied by a user, the actuator means positioned within an internal opening of the shaft; and
   a force transmission means positioned proximate to the actuator means, the force transmission means translates a first force applied by the user in a first direction to act against the force of the biasing means to release the frictional pads from the compressed frictional engagement to allow the first friction pads to rotate relative to the second friction pads.

2. The mechanism of claim 1, further comprising:
   a second biasing means configured to bias the first part to an upright position with respect to the second part when the actuator means is not actuated by the user.

3. The mechanism of claim 2, wherein the second biasing means is a torsional spring, and whereby application of a second force to the actuator means by the user, opposite to the first force, causes the second biasing means to return the first part to the upright position from a reclined position.

4. The mechanism of claim 1, wherein the first pads have a shape different from that of the second pads.

5. The mechanism of claim 1, further comprising hard stops to limit rotational movement of the friction pads.

6. The mechanism of claim 1, wherein the biasing means is a compression spring that, in the normal state, positions the force transmission means such that when the actuator means is not operated, force is applied to compress the friction pads and when the actuator means is operated, compressive force is removed to disengage the friction pads.

7. The mechanism of claim 1, wherein the force transmission means comprises:
   a first component that is moved in response to actuation of the actuator means by the user; and
   a second component that is moved by engagement with the first component to release the friction pads from compression engagement and wherein in the normal state, when the actuator means is not actuated by the user, the first component engages with the second component such that the second component presses against the friction pads.

8. The mechanism of claim 7, wherein the first component comprises:
   an element that is engaged with the actuator means and is shaped to engage with a first end of the second component, where the second component is a lever arranged to pivot around a pivot point in response to engagement with the first component, the second end of the second component moving relative to the friction pads as the second component pivots.

9. The mechanism of claim 1, further comprising:
   head injury criterion, HIC, features, the HIC features comprising:
   a lock ring and a key ring that in a normal state are arranged axially one behind the other and in a lock state rotate relative to each other to engage in the same axial position one radially outward from the other, and wherein the HIC features are mounted axially with respect to the friction pads such that the compressive force on the pads is reduced when the HIC lock ring and key ring are in the lock state.

10. The mechanism of claim 1, wherein the first part is a seat back and the second part is one of a seat pan or a seat cushion of a reclining seat.

11. The mechanism of claim 10, wherein the reclining seat is an aircraft seat.

12. An aircraft seat comprising:
   a seat back adjustable relative to one of a seat pan or a seat cushion; and
   a rotary mechanism configured to allow reclining movement of the seat pan relative to one of the seat pan or the seat cushion, the rotatory mechanism comprising:
   a plurality of friction pads arranged to be compressed together into a compressed frictional engagement, the plurality of friction pads comprising alternating first friction pads connected to the first part and second friction pads connected to the second part, wherein the first friction pads are attached to a shaft that is connected to the first part and the second friction pads are attached to a casing which is attached to the second part;

a biasing means to bias the friction pads into the compressed frictional engagement;

an actuator means to which force is applied by a user, the actuator means positioned within an internal opening of the shaft; and a force transmission means positioned proximate to the actuator means, the force transmission means translates a first force applied by the user in a first direction to act against the force of the biasing means to release the frictional pads from the compressed frictional engagement to allow the first friction pads to rotate relative to the second friction pads.

13. The aircraft seat of claim 12, further comprising: one or more seat arms, and wherein the actuator means is couple to a seat arm of the one or more seat arms.

\* \* \* \* \*